United States Patent
Iida et al.

(10) Patent No.: US 11,435,645 B2
(45) Date of Patent: Sep. 6, 2022

(54) SEMICONDUCTOR DEVICE AND METHOD OF MANUFACTURING THE SAME

(71) Applicant: RENESAS ELECTRONICS CORPORATION, Tokyo (JP)

(72) Inventors: Tetsuya Iida, Tokyo (JP); Yasutaka Nakashiba, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 113 days.

(21) Appl. No.: 16/872,805

(22) Filed: May 12, 2020

(65) Prior Publication Data

US 2020/0409231 A1 Dec. 31, 2020

(30) Foreign Application Priority Data

Jun. 25, 2019 (JP) .............................. JP2019-116864

(51) Int. Cl.
*G02F 1/225* (2006.01)
*G02F 1/21* (2006.01)

(52) U.S. Cl.
CPC ............ *G02F 1/2257* (2013.01); *G02F 1/212* (2021.01)

(58) Field of Classification Search
CPC ........ G02F 1/2257; G02F 1/212; G02F 1/025; G02F 2203/50
See application file for complete search history.

(56) References Cited

U.S. PATENT DOCUMENTS

| | | | | |
|---|---|---|---|---|
| 11,099,454 | B2* | 8/2021 | Yu | G02F 1/2257 |
| 2012/0003767 | A1* | 1/2012 | Fujikata | G02F 1/025 |
| | | | | 438/31 |
| 2012/0177318 | A1* | 7/2012 | Zheng | G02F 1/025 |
| | | | | 385/1 |
| 2015/0277207 | A1* | 10/2015 | Fujikata | G02F 1/0123 |
| | | | | 385/3 |
| 2016/0109731 | A1* | 4/2016 | Huang | G02F 1/025 |
| | | | | 385/3 |
| 2016/0291350 | A1 | 10/2016 | Fujikata et al. | |
| 2020/0321477 | A1* | 10/2020 | Ren | H01L 29/0623 |

FOREIGN PATENT DOCUMENTS

WO 2014/155450 A1 10/2014

OTHER PUBLICATIONS

"Indium-tin-oxide thin film prepared by microwave-enhanced d.c. reactive magnetron sputtering for telecommunication wavelengths" by Meng et al., Thin Solid Films, vol. 422, pp. 80-86 (Year: 2002).*

* cited by examiner

*Primary Examiner* — Robert Tavlykaev
(74) *Attorney, Agent, or Firm* — McDermott Will & Emery LLP

(57) ABSTRACT

A semiconductor device has a first semiconducting layer including an optical waveguide, a dielectric layer formed on the optical waveguide, and a conductive layer formed on the dielectric layer. A refractive index of a material of the conductive layer is smaller than a refractive index of a material of the first semiconductor layer.

10 Claims, 20 Drawing Sheets

SEMICONDUCTOR DEVICE AND METHOD OF MANUFACTURING THE SAME

CROSS-REFERENCE TO RELATED APPLICATIONS

The disclosure of Japanese Patent Application No. 2019-116864 filed on Jun. 25, 2019 including the specification, drawings and abstract is incorporated herein by reference in its entirety.

BACKGROUND

Some embodiments relate to a semiconductor device and a method of manufacturing the semiconductor device, for example, a semiconductor device and a method of manufacturing the semiconductor device including an optical waveguide.

As an optical communication technique, a silicon photonics technique is known. The semiconductor device in which the silicon photonics technique is applied includes, for example, an optical modulator for changing the phase of light in an optical waveguide.

There is a disclosed technique listed below.
[Patent Document 1] WO 2014/155450

An optical modulator described in Patent Document 1 includes a first semiconductor layer including an optical waveguide, an insulating layer formed on the optical waveguide, and a second semiconductor layer formed on the insulating layer. Example of a material for second semiconducting layer includes polycrystalline silicon and amorphous silicon. In the optical modulator, light travels with the light substantially confined within the optical waveguide. In this instance, a carrier density in the optical waveguide can be changed by applying bias to optical modulator. Thus, the phase of the light propagating inside the optical waveguide can be adjusted.

However, strictly speaking, the light propagating inside the optical waveguide proceeds in a state where a portion of the light seeps out of the optical waveguide. In this instance, when the second semiconductor layer is made of polycrystalline silicon and amorphous silicon, a portion of the light may be scattered by the second semiconductor layer. As a result, in the optical modulator, optical propagation losses become large. Thus, there is a room for improvement of the conventional optical modulator from a viewpoint of enhancing the characteristics of semiconductor device.

A problem of the embodiments is improving of the characteristics of a semiconductor device. Other objects and novel features will become apparent from the description of the specification and the drawings.

SUMMARY

A semiconductor device according to embodiments includes a first semiconductor layer including an optical waveguide, a dielectric layer formed on the optical waveguide, and a conductive layer formed on the dielectric layer. A refractive index of a material of the conductive layer is smaller than a refractive index of a material of the first semiconductor layer.

A method of manufacturing a semiconductor device according to embodiments includes forming a dielectric layer on a semiconductor layer, forming a conductive layer on the dielectric layer, and forming an optical waveguide composed of a portion of the semiconductor layer.

A method of manufacturing a semiconductor device according to other embodiments includes forming a dielectric layer on a semiconductor layer, forming a sacrificial layer on the dielectric layer, forming an optical waveguide comprised of a portion of the semiconductor layer, and replacing the sacrificial layer with a conductive layer.

According to embodiments, characteristics of a semiconductor device including an optical waveguide can be improved.

DETAILED DESCRIPTION

Figure 1:
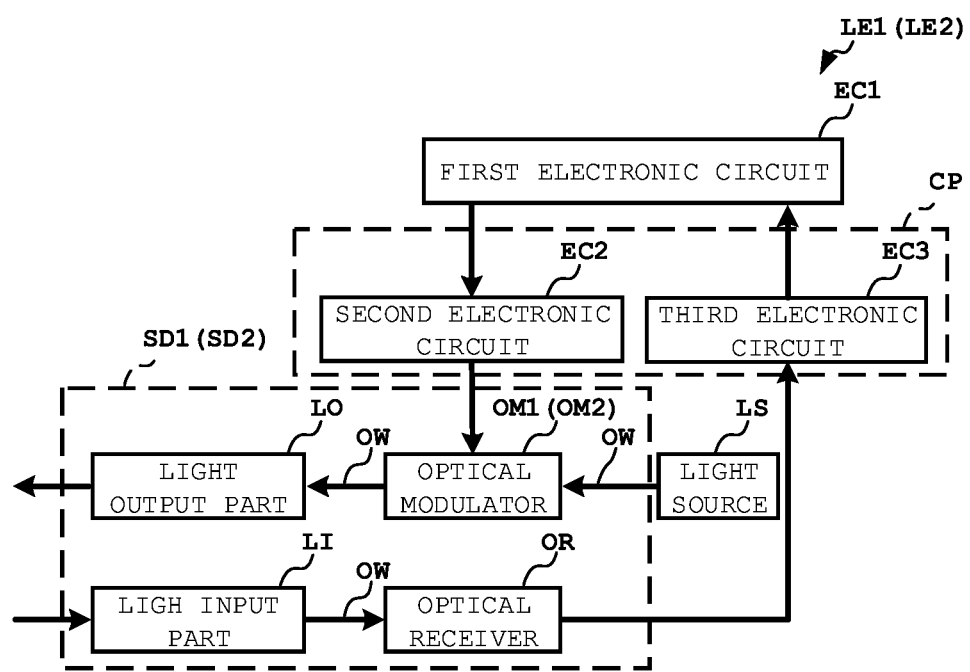
FIG. 1 is a block diagram showing an exemplary circuit configuration of an optoelectronic hybrid device according to a first embodiment and a second embodiment.

Hereinafter, a semiconductor device according to embodiments will be described in detail by referring to the drawings. In the specification and the drawings, the same or corresponding elements are denoted by the same reference numerals, and a repetitive description thereof is omitted. In the drawings, for convenience of description, the configuration may be omitted or simplified.

First Embodiment (Circuit Configuration of Optoelectronic Hybrid Device)

FIG. 1 is a block diagram showing an exemplary circuit configuration of an optoelectronic hybrid device LE1 according to a first embodiment.

As shown in FIG. 1, the optoelectronic hybrid device LE1 includes a first electronic circuit EC1, a semiconductor device SD1, a light source LS, and an IC chip CP. The semiconductor device SD1 according to the first embodiment includes an optical waveguide OW, an optical modulator OM1, a light output part LO, a light input part LI, and an optical receiver OR. The IC chip CP includes a second electronic circuit EC2 and a third electronic circuit EC3. The configuration of the semiconductor device SD1 will be described in detail later.

The first electronic circuit EC1 outputs an electric signal for controlling the second electronic circuit EC2 and the third electronic circuit EC3, respectively. The first electronic circuit EC1 receives an electric signal outputted from the third electronic circuit EC3. The first electronic circuit EC1 is electrically coupled with the second electronic circuit EC2 and the third electronic circuit EC3. The first electronic circuit EC1 is formed of, for example, a known CPU (Central Processing Unit) or a FPGA (Field-Programmable gate array) including a control circuit and a storage circuit.

The light source LS emits light. Examples of the types of light source LS include a laser diode LD. A wavelength of the light emitted from the light source LS may be set as appropriate in accordance with the material constituting the optical waveguide OW as long as the emitted light can pass through the inside of the optical waveguide OW. For example, a peak wavelength of the light emitted from the light source LS is 1.0 μm or more and 1.6 μm or less. The light source LS is optically connected with the optical modulator OM1 through the optical waveguide OW.

The second electronic circuit EC2 outputs an electric signal (control signal) for controlling the operation of the optical modulator OM1. More specifically, the second electronic circuit EC2 controls the optical modulator OM1 based on the control signal received from the first electronic circuit EC1. The second electronic circuit EC2 is electrically coupled with the optical modulator OM1. The second electronic circuit EC2 is constituted by, for example, a known transceiver IC including a control circuit.

The optical modulator OM1 modulates the phase of the light emitted from the light source LS based on the control signal received from the second electronic circuit EC2. The optical modulator OM1 generates an optical signal including information included in the control signal. A type of the optical modulator OM1 is a Mach-Zehnder type optical modulator. The optical modulator OM1 may be an electrically controlled optical modulator, or a combined optical modulator using a combination of electrical control and thermal control. The optical modulator OM1 is optically connected with the light output part LO through the optical waveguide OW.

The light output part LO outputs the optical signal modulated by the optical modulator OM1 to the outside of the semiconductor device SD1. For example, the light output part LO emits an optical signal toward an external optical fiber. Examples of types of the light output part LO include a grating coupler (GC) and a spot size converter (SSC).

The light input part LI inputs external light into the semiconductor device SD1. For example, an optical signal emitted from external optical fiber is inputted into the semiconductor device SD1. Examples of types of light input part LI include a grating coupler (GC) and a spot size converter (SSC). The light input part LI is optically connected with the optical receiver OR through the optical waveguide OW.

The optical receiver OR generates electron-hole pairs based on the optical signal received from the light input part LI. The optical receiver OR converts an optical signal into an electric signal. The optical receiver OR may include photoelectric conversion characteristic. Examples of types of the optical receiver OR include an avalanche photodiode type optical receiver. The optical receiver OR is electrically coupled with the third electronic circuit EC3.

The third electronic circuit EC3 processes an electric signal received from the optical receiver OR and outputs the processed electric signal to the first electronic circuit EC1. More specifically, the third electronic circuit EC3 amplifies the electric signal received from the optical receiver OR and outputs the amplified electrical signal to the first electronic circuit EC1. The third electronic circuit EC3 is constituted by, for example, a known receiver IC including an amplifier circuit.

(Operation of Optelectronic Hibrid Device)

Next, an exemplary operation of the optoelectronic hybrid device LE1 according to the first embodiment will be described.

First, the transmission part of the optoelectronic hybrid device LE1 will be described. The light emitted from the light source LS reaches the optical modulator OM1 through the optical waveguide OW. The second electronic circuit EC 2 controls the operation of optical modulator OM1 based on the control signal received from the first electronic circuit EC1, and modulates the light reaching optical modulator OM1. As a result, the electric signal is converted into an optical signal. The optical signal reaches the light output part LO through the optical waveguide OW, and the optical signal is output to the outside of the semiconductor device SD1 in the light output part LO. The optical signal outputted from the semiconductor device SD1 is guided to another semiconductor device through an optical fiber or the like.

Next, the receiving part of the optoelectronic hybrid device LE1 will be described. An optical signal guided from another semiconductor device through an optical fiber or the like reaches the light input part LI. The optical signal is guided to the inside of the optical waveguide OW in the light input part LI. The optical signal reaches the optical receiver OR through the optical waveguide OW, and is converted into an electric signal. The electric signal is processed by the third electronic circuit EC3 and then transmitted to the first electronic circuit EC1.

(Configuration of Semiconductor Device)

Next, a configuration of the semiconductor device SD1 according to the embodiment will be described.

Figure 2:
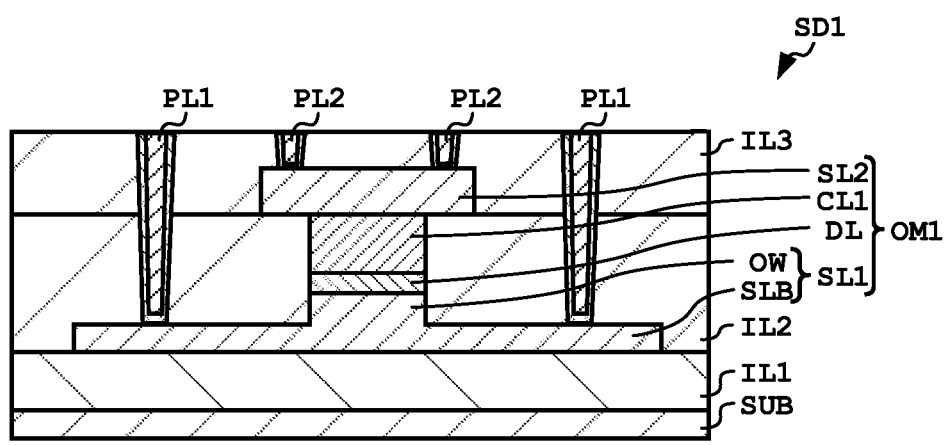
FIG. 2 is a cross-sectional view of a main portion of a semiconductor device according to the first embodiment.

FIG. 2 is a cross-sectional view of a main portion of the semiconductor device SD1. In other words, FIG. 2 is the cross-sectional view at a cross-section perpendicular to an extending direction of the optical waveguide OW and passing through the optical modulator OM1 in the semiconductor device SD1.

As shown in FIG. 2, the semiconductor device SD1 includes a substrate SUB, a first insulating layer IL1, an optical modulator OM1, a second insulating layer IL2, a third insulating layer IL3, a first plug PL1, and a second plug PL2. The optical modulator OM1 includes a first semiconductor layer SL1 including an optical waveguide OW and a slab portion SLB, a dielectric layer DL, a conductive layer CL1, and a second semiconductor layer SL2.

The substrate SUB is a support for supporting the optical modulator OM1 through the first insulating layer IL1. Examples of types of the substrate SUB include silicone substrate. The silicon substrate is, for example, a silicon single-crystal substrate containing impurities such as boron (B) and phosphorus (P). For example, a plane orientation of a main surface of the silicon substrate is (100), and a resistivity of the silicon substrate is 5 Ω·cm or more and 50 Ω·cm or less. A thickness of the substrate SUB is, for example, 100 µm or more and 900 µm or less.

The first insulating layer IL1 is formed on the substrate SUB. The first insulating layer IL1 is a cladding layer for substantially confining the light propagating inside the optical waveguide OW to the inside of the optical waveguide OW. A material of the first insulating layer IL1 has a refractive index smaller than a refractive index of a material of the optical waveguide OW. Examples of materials of the first insulating layer IL1 include silicon oxide ($SiO_2$). The refractive index of the materials of the first insulating layer IL1 is, for example, 1.46. In this specification, the refractive index is a numerical value for light having a wavelength of 1.5 µm.

It is preferable that the thickness of the first insulating layer IL1 is greater than a light seepage length from the optical waveguide OW. From the viewpoint of reducing stresses applied to the semiconductor device SD1 and from the viewpoint of suppressing sticking of a semiconductor wafer by the electrostatic chucks during manufacturing of the semiconductor device SD1, the thickness of the first insulating layer IL1 is preferable small. For example, the thickness of the first insulating layer IL1 is 2 µm or more and 3 µm or less.

When the first insulating layer IL1 functions as a support layer, the semiconductor device SD1 may not include the substrate SUB. In this case, the first insulating IL1 is, for example, sapphire substrate.

The optical modulator OM1 according to the first embodiment is a Mach-Zehnder type optical modulator. The optical modulator OM1 includes an input optical waveguide, a pair of optical waveguides OW branched from an optical waveguide OW for input, and an optical waveguide OW for output. FIG. 2 shows an area near one of the pair of optical waveguides OW as a main portion of the semiconductor device SD1 according to first embodiment.

The optical modulator OM1 includes a first semiconductor layer SL1 including the optical waveguide OW, a dielectric layer DL, a conductive layer CL1, and a second semiconductor layer SL2.

The first semiconductor layer SL1 includes an optical waveguide OW and a pair of slab portions SLB. The first semiconductor layer SL1 is semiconductor having a first conductivity type. The first conductivity type may be an n-type or a p-type. When the first conductivity type is n-type, the first semiconductor layer SL1 contains n-type impurities such as arsenic (As) and phosphorus (P). When the first conductivity type is p-type, second semiconductor layer SL2 contains p-type impurities such as boron (B) and boron difluoride (BF2). Impurity concentration of the first semiconductor layer SL1 is, for example, $1 \times 10^{17}/cm^3$ or more.

The material of the first semiconductor layers SL1 is a semiconductor material transparent to light passing through the inside of the optical waveguide OW. Examples of materials for the first semiconductor layer SL1 include silicon and germanium. The crystal structure of the material of the first semiconductor layer SL1 may be single crystal or polycrystalline. The refractive index of the first semiconductor layer SL1 is, for example, 3.5.

The optical waveguide OW is a path through which light can propagate. The optical waveguide OW is formed on the first insulating layer IL1. The optical waveguide OW is directly or indirectly covered by the first insulating layer IL1, the second insulating layer IL2, the dielectric layer DL and the conductive layer CL1. In the first embodiment, an upper surface of the optical waveguide OW directly contacts with the dielectric layer DL. In other words, the upper surface of the optical waveguide OW is indirectly contacts with the conductive layer CL1 through the dielectric layer DL. Both side surfaces of the optical waveguide are directly contact with the second insulating layer IL2. A lower surface of the optical waveguide OW directly contacts with the first insulating layer IL1.

The optical waveguide OW is covered by the first insulating layer IL1, the second insulating layer IL2, the dielectric layer DL and the conductive layer CL1 having a refractive index less than the refractive index of the a material of the optical waveguide OW. Thus, the light can travel inside the optical waveguide OW while being substantially confined inside the optical waveguide OW. However, the light travels inside the optical waveguide OW while seeping out to the outside of the optical waveguide OW by the wavelength order of the light.

The cross-sectional shape of the optical waveguide OW in the cross-section orthogonal to an extending direction of the optical waveguide OW may be any shape as long as light can propagate inside the optical waveguide OW. Examples of the cross-sectional shapes of the optical waveguide OW include a rectangular shape and a trapezoidal shape.

A width and a thickness (height) of the optical waveguide OW may be any size as long as light can propagate appropriately inside the optical waveguide OW. The width and the thickness of the optical waveguide OW can be appropriately set in accordance with conditions such as the wavelength of light passing through the inside of the optical waveguide OW and a mode of the light. The width of the optical waveguide OW is, for example, 300 nm or more and 500 nm or less. The thickness of the optical waveguide OW is, for example, 200 nm or more and 300 nm or less.

The width of the optical waveguide OW is a distance between both side surfaces of the optical waveguide OW, and is a length of the optical waveguide OW in a facing direction (width direction) of both side surfaces. The thickness of the optical waveguide OW is the distance between a bottom surface of the first semiconductor layer SL1 and the upper surface of the optical waveguide OW.

The slab portion SLB is formed on the first insulating layer IL1. The slab portion SLB is formed on the first insulating layer IL1 such that the slab portion SLB adjacent to the optical waveguide OW in the width direction of the optical waveguide OW. The slab portion SLB is formed integrally with the optical waveguide OW as a single member.

A thickness of the slab portion SLB is preferably smaller than the thickness of the optical waveguide OW from the viewpoint of appropriately confining light inside the optical waveguide OW. The thickness of slab portion SLB is preferably about 100 nm. From the viewpoint of suppressing a voltage drop in the slab portion SLB and from the viewpoint of forming an ohmic junction between the first plug PL1 and the slab portion SLB, it is preferable that an impurity concentration of the slab portion SLB is greater than an impurity concentration of the optical waveguide OW.

The dielectric layer DL is formed on the first semiconductor layer SL1. The dielectric layer DL electrically insulates the first semiconductor layer SL1 and the second semiconductor layer SL2. The thickness of the dielectric layer DL is, for example, 10 nm or more and 30 nm or less. The dielectric layer DL is made of, for example, silicon oxide ($SiO_2$).

The conductive layer CL1 is formed on the dielectric layer DL. The conductive layer CL1, together with the second semiconducting layer SL2, constitutes the electrodes in the optical modulator OM1. The conductive layer CL1 is a transparent electrode in the optical modulator OM1. As a result, it is possible to suppress the light seeping out of the optical waveguide OW from being scattered by the conductive layer CL1. From such a viewpoint, it is preferable that the conductive layer CL1 has a transmittance of 60% or more with respect to light having a wavelength of 1.1 μm or more and 1.6 μm or less.

A conductivity of the conductive layer CL1 may be as long as the conductive layer CL1 can function as a part of an electrode. The conductivity of the conductive layer CL1 is, for example, 300 μ$\square$ cm or more and 700 μ$\square$ cm or less.

The refractive index of the material of the conductive layer CL1 is smaller than the refractive index of the material of the first semiconducting layer SL1. Thus, the conductive layer CL1 functions as a cladding layer for confining light inside the optical waveguide OW. As a result, it is possible to suppress the light seeping out of the optical waveguide OW from being scattered by second semiconducting layer SL2 and second plugs PL2 formed on the conductive layer CL1. From this viewpoint, the refractive index of the material of the conductive layers CL1 is preferably 1.5 or more and 2.0 or less.

The material of the conductive layer CL1 is not particularly limited as long as the material of the conductive layer CL1 is not metallic and the conductive layer CL1 can exhibit the above-mentioned function. Examples of materials for the conductive layer CL1 include ITO (Indium Tin Oxide), titanium oxide ($TiO_2$), gallium-doped zinc oxide (GZO), and indium-gallium-doped zinc oxide (IGZO).

A thickness of the conductive layer CL1 is preferably large from the viewpoint of suppressing light seeping out of the optical waveguide OW from reaching the second semiconductor layer SL2 and the second plug PL2 and being scattered. For example, the thickness of the conductive layer CL1 is preferably 350 nm or more. The thickness of the conductive layer CL1 is preferably small from the viewpoint of reducing the resistivity of the first plug PL1 by reducing the height of the first plug PL1. For example, the thickness of the conductive layer CL1 is preferably 450 nm or less.

A total thickness of a protrusion portion of the first semiconducting layer SL1, the dielectric layer DL, and the conductive layer CL1 is preferably large from the viewpoint of facilitating the polishing process of the second insulating layer IL2. The total thickness is a distance between an upper surface of the slab portion SLB and an upper surface of the conductive layer CL1 in a thickness direction of the optical waveguide OW. The total thickness is preferably 500 nm or more.

The second semiconductor layer SL2 is formed on the conductive layer CL1 and the second insulating layer IL2. The second semiconductor layer SL2 together with the conducting layer CL1 constitute the electrodes of the optical modulator OM1. In other words, the second semiconductor layer SL2 electrically connects the second plug PL2 with the conductive layer CL1 between the second plug PL2 and the conductive layer CL1.

The second semiconductor layer SL2 has a second conductivity type. The second conductivity type may be n-type or p-type. That is, the first conductivity type and the second conductivity type may be the same or different from each other. In the first embodiment, the second conductivity type is n-type. An example of the impurity contained in the second semiconductor layer SL2 is the same as the example of the impurity contained in the first semiconductor layer SL1. Impurity concentration of second semiconductor layer SL2 is $1\times10^{17}/cm^3$ or more. Examples of materials for the second semiconductor layer SL2 are, for example, polycrystalline silicon.

A width of the second semiconductor layer SL2 is preferably greater than the width of the optical waveguide OW. As a result, the second plug PL2 can be formed at a position without overlapping with the optical waveguide OW in plan view. It is possible to suppress an increase in contact leakage and a loss of light seeping out of the optical waveguide OW caused by plasmon resonance. The width of second semiconductor layer SL2 is a length of the second semiconductor layer SL2 in the width direction of the optical waveguide OW.

The second insulating layer IL2 and the third insulating layer IL3 are formed on the first insulating layer IL1 such that the second insulating layer IL2 and the third insulating layer IL3 cover optical modulator OM1. The second insulating layer IL2 is formed on the first insulating layer IL1 such that the second insulating layer IL2 covers the first semiconductor layer SL1, the dielectric layer DL, and the conductive layer CL1. An upper surface of the second insulating layer IL2 is located at approximately the same height as an upper surface of the conductive layer CL1. The third insulating layer IL3 is formed on the second insulating layer IL2 such that the third insulating layer IL3 covers the second semiconductor layer SL2.

The second insulating layer IL2 and third insulating layer IL3 are made of a material having a refractive index smaller than a refractive index of the material of the optical waveguide OW. Examples of materials of the second insulating layer IL2 include silicon oxide ($SiO_2$). The refractive index of the material of the second insulating layer IL2 is, for example, 1.46.

From viewpoint of suppressing form scattering of light seeping out of the optical waveguide OW by a wiring (not shown) formed on third insulating layer IL3, the total thickness of second insulating layer IL2 and the third insulating layer IL3 is preferable 1.5 μm or more. Further, from the viewpoint of ease of manufacturing processes, it is more preferable that the total thickness of the second insulating layer IL2 and the third insulating layer IL3 be about 2 μm.

The first plug PL1 is formed to bury a through hole formed in the second insulating layer IL2 and the third insulating layer IL3. The first plug PL1 electrically connects the slab portion SLB of the first semiconductor layer SL1 and the wiring (not shown) to each other. The first plug PL1 is formed to reach the slab portion SLB of the optical modulator OM1 along a thickness of the second insulating layer IL2. As the first plug PL1, a known structure adopted as a plug in the semiconductor technology can be adopted. The first plug PL1 includes, for example, a barrier film and a conductive film formed on the barrier film. Examples of materials for the barrier film include titanium (Ti) and titanium nitride (TiN). The material of the conductive film is, for example, tungsten (W).

The second plug PL2 is formed such that the second plug PL2 buries a through hole formed in the third insulating layer IL3. The second plug PL2 electrically connects the conductive layer CL1 and a wiring (not shown) to each other through the second semiconducting layer SL2. The second plug PL2 is formed such that the second plug PL2 reaches the second semiconductor layer SL2 along a thickness direction of the third insulating layer IL3. It is preferable that the second plug PL2 is formed at position different from the optical waveguide OW in plan view. As described above, it is possible to suppress an increase in contact leakage and a loss of light seeping out of the optical waveguide OW caused by plasmon resonance.

As for the second plug PL2, a known structure adopted as a plug in the semiconductor technology can be adopted. Examples of materials of the second plug PL2 are the same as that of the first plug PL1.

(Role of Conductive Layer CL1)

Here, roles of the conductive layer CL1 in semiconductor device SD1 according to the first embodiment will be described. For comparison, a semiconductor device including an optical receiver composed of a first semiconductor layer SL1, a dielectric layer DL, and a polycrystalline semiconductor layer (hereinafter also referred to as "comparative semiconductor device 1") will also be described (see the Patent Document 1). That is, the comparative semiconductor device 1 does not include the conductive layer CL1. The polycrystalline semiconductor layer corresponds to the second semiconductor layer SL2. In the comparative semiconductor device 1, a refractive index of a material of the polycrystalline semiconductor layer is about the same as the refractive index of the material of the optical waveguide OW. Therefore, light also propagates inside the polycrystalline semiconductor layer. That is, the light traveling inside the optical waveguide OW is scattered due to the grains of the material constituting the polycrystalline semiconductor layer. In the comparative semiconductor device 1, when the light seeping out of the optical waveguide OW reaches second plug PL2, the light is scattered by second plug PL2. As a result, in the comparative semiconductor device 1, optical propagation loss is large.

In contrast, in the semiconductor device SD1 according to the first embodiment, the refractive index of the material of the conductive layer CL1 is smaller than the refractive index of the material of the optical waveguide OW. Therefore, the conductive layer CL1 functions as a cladding layer for confining light inside the optical waveguide OW. This makes it difficult for the light seeping out of the optical waveguide OW to reach the second semiconductor layer SL2 and the second plug PL2, which cause light scattering. As a result, the first embodiment can reduce optical loss of light traveling inside the optical waveguide OW.

Strictly speaking, the light travels through the inside of the optical waveguide OW while seeping into the inside of the conductive CL1 formed on the optical waveguide OW. In first embodiment, the conductive layer CL1 is made of a material having a high transmittance to light. Therefore, it is possible to reduce the optical loss of the light traveling inside the optical waveguide OW as compared with the comparative semiconductor device 1.

(Method of Manufacturing Semiconductor Device)

Next, an exemplary method of manufacturing the semiconductor device SD1 according to the first embodiment will be described. FIGS. 3 to 11 are cross-sectional views showing exemplary steps included in the method of manufacturing the semiconductor device SD1.

The method of manufacturing the semiconductor device SD1 according to the first embodiment includes (1) providing a semiconductor wafer SW, (2) forming the dielectric layer DL, (3) forming the conductive layer CL1, (4) forming the optical waveguide OW, (5) forming the second insulating layer IL2, (6) polishing the second insulating layer IL2, (7) forming the second semiconductor layer SL2, (8) forming the third insulating layer IL3, and (9) forming the first plug PL1 and second plug PL2.

(1) Providing a Semiconductor Wafer SW

Figure 3:
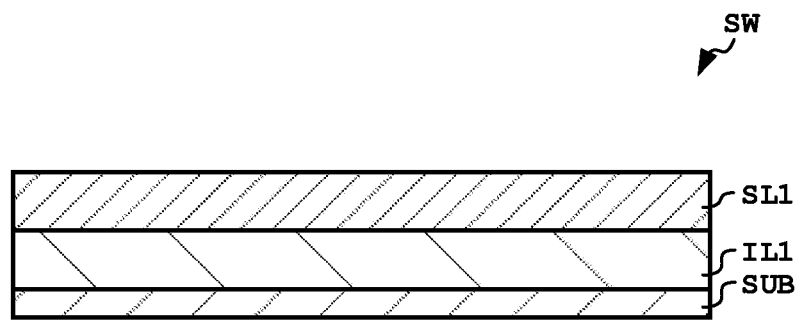
FIG. 3 is a cross-sectional view showing an exemplary step included in a method of manufacturing the semiconductor device according to the first embodiment.

First, as shown in FIG. 3, a semiconductor wafer SW including a substrate SUB, a first insulating layer IL1 formed on the substrate SUB, and a semiconductor layer SL formed on the first insulating layer IL1 is provided.

The semiconductor wafer SW may be manufactured or purchased as a commercial product. The semiconductor wafer SW is, for example, an SOI (Silicon On Insulator) substrate. A method of manufacturing the SOI substrate can be appropriately selected from a known manufacturing method. Example of the method of manufacturing the SOI substrate include SIMOX (Separation by Implantation of Oxygen) method and smart-cut method. Next, an impurity of a desired impurity concentration is implanted into the semiconductor layer SL by ion implantation method.

Examples of materials of the substrate SUB and impurity materials are described above. Examples of materials for the semiconductor layer SL include silicon and germanium. Crystal structure of the material of the semiconductor layer SL may be single crystal or polycrystalline.

(2) Forming the Dielectric Layer DL

Figure 4:
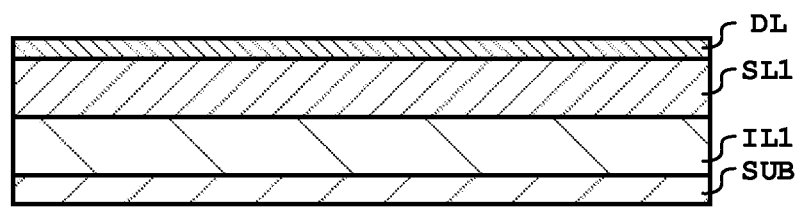
FIG. 4 is a cross-sectional view showing an exemplary step included in the method of manufacturing the semiconductor device according to the first embodiment.

Next, as shown in FIG. 4, the dielectric layer DL is formed on the semiconductor layer SL. Examples of the method of forming the dielectric layer DL include CVD method and thermal oxidation method.

(3) Forming the Conductive Layer CL1

Figure 5:
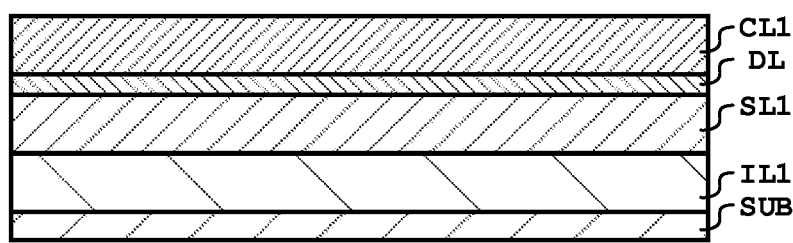
FIG. 5 is a cross-sectional view showing an exemplary step included in the method of manufacturing the semiconductor device according to the first embodiment.

Next, as shown in FIG. 5, the conductive layer CL1 is formed on the dielectric layer DL. The conductive layer CL1 is formed by, for example, sputtering method.

(4) Forming the Optical Waveguide OW

Figure 6:
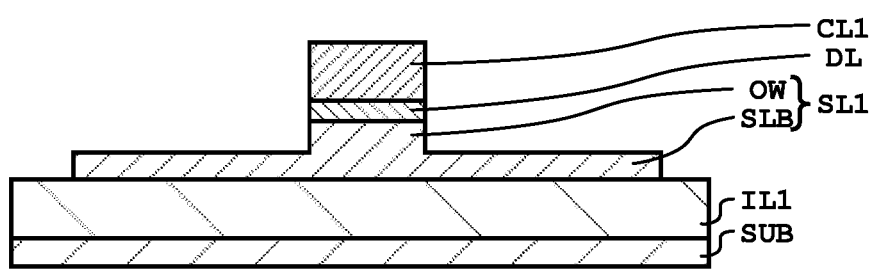
FIG. 6 is a cross-sectional view showing an exemplary step included in the method of manufacturing the semiconductor device according to the first embodiment.

Next, as shown in FIG. 6, the semiconductor layer SL, the dielectric layer DL, and the conductive layer CL1 are patterned to form optical waveguides OW and slab portion SLB composed of a portion of the semiconductor layer SL. More specifically, the conductive layer CL1 and the dielectric layer DL are removed in a region other than the region where the optical waveguide OW is formed, and the semiconductor layer SL is patterned so that a part of the semiconductor layer SL remains in the thickness direction of the semiconductor layer SL. In addition, of the semiconductor layer SL, portions of the semiconductor layer SL other than the portions that become the optical waveguide OW and the slab portion SLB are also patterned into desired shapes. The patterning of the semiconductor layer SL can be performed by photolithography and etching techniques.

In this case, from the viewpoint of patterning the semiconductor layer SL, the dielectric layer DL, and the conductive layer CL1 such that the part of the semiconductor layer SL remains appropriately, it is preferable that the thickness of the conductive layer CL1 be small. As described above, the thickness of the conductive layer CL1 is preferably 450 nm or less, for example.

Impurities may be implanted into the slab portion SLB by photolithography and ion implantation method. As a result, an impurity concentration of the slab portion SLB is greater than an impurity concentration of the optical waveguide OW.

(5) Forming the Second Insulating Layer IL2

Figure 7:
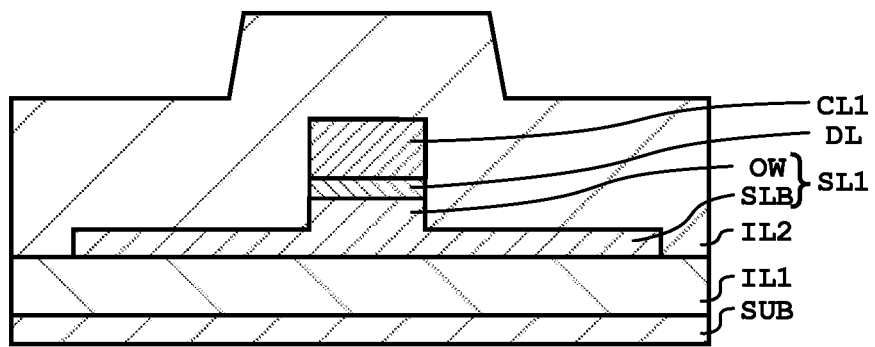
FIG. 7 is a cross-sectional view showing an exemplary step included in the method of manufacturing the semiconductor device according to the first embodiment.

Next, as shown in FIG. 7, the second insulating layer IL2 is formed on the first insulating layer IL1 such that the second insulating layer IL2 covers the optical waveguide OW, the slab portion SLB, the dielectric layer DL, and the conductive layer CL1. The method of forming the second insulating layer IL2 is, for example, CVD method.

(6) Polishing the Second Insulating Layer IL2

Figure 8:
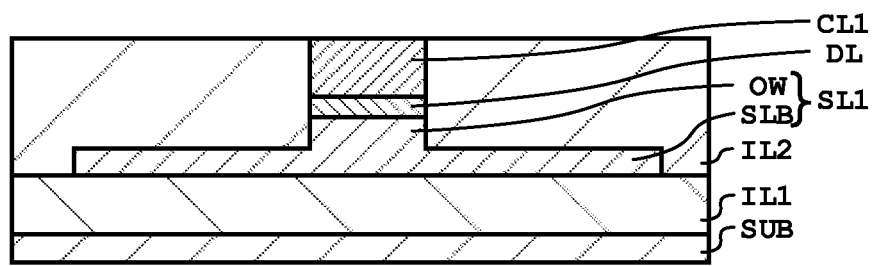
FIG. 8 is a cross-sectional view showing an exemplary step included in the method of manufacturing the semiconductor device according to the first embodiment.

Next, as shown in FIG. 8, an upper surface of second insulating layer IL2 is polished so that the conductive layer CL1 is exposed from the second insulating layer IL2. Thus, the upper surface of second insulating layer IL2 and upper surface of the conductive layer CL1 are located in the same plane. Methods of polishing the upper surface of second insulating layer IL2 include, for example, CMP method.

(7) Formation of the Second Semiconductor Layer SL2

Figure 9:
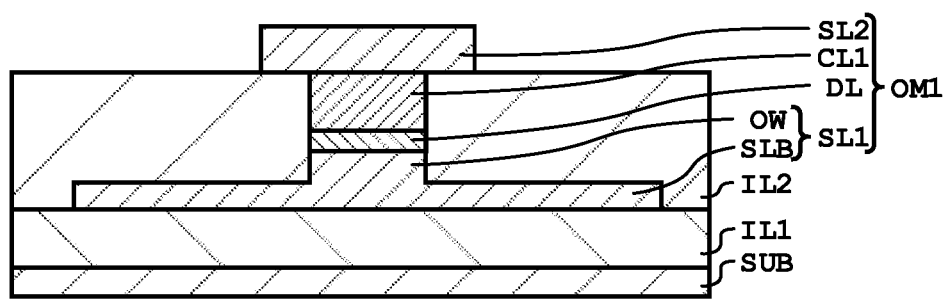
FIG. 9 is a cross-sectional view showing an exemplary step included in the method of manufacturing the semiconductor device according to the first embodiment.

Next, as shown in FIG. 9, the second semiconductor layer SL2 is formed on the conductive layer CL1 and the second insulating layer IL2 which are exposed from the second insulating layer IL2. For example, the second semiconductor layer SL2 can be formed by depositing a semiconductor film on the conductive layer CL1 and second insulating layer IL2 by CVD method, and then patterning the semiconductor film by photolithography technique and an etching technique so that the semiconductor film has a desired pattern. As a result, the optical modulator OM1 including the first semiconductor layer SL1 including the optical waveguide OW and the slab portion SLB, the dielectric layer DL, the conductive layer CL1, and second semiconductor layer SL2 is formed.

(8) Forming the Third Insulating Layer IL3

Figure 10:
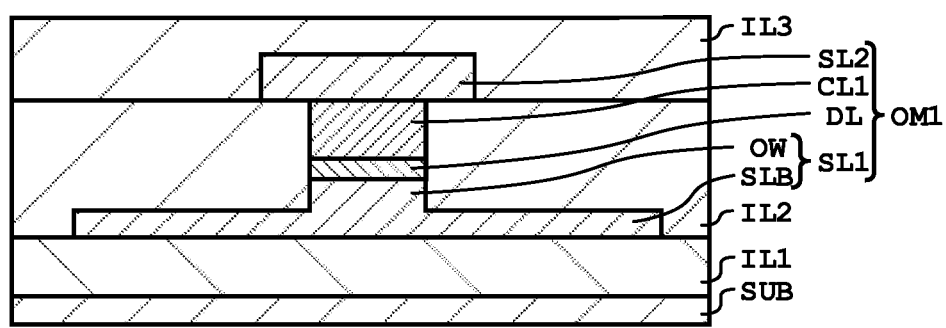
FIG. 10 is a cross-sectional view showing an exemplary step included in the method of manufacturing the semiconductor device according to the first embodiment.

Next, as shown in FIG. 10, the third insulating layer IL3 is formed on the second insulating layer IL2 so as to cover the second semiconductor layer SL2. The method of forming the second insulating layer IL2 is, for example, CVD method. An upper surface of the third insulating layer IL3 may be polished by a method similar to the polishing method described above.

(9) Forming the First Plug PL1 and the Second Plug PL2

Figure 11:
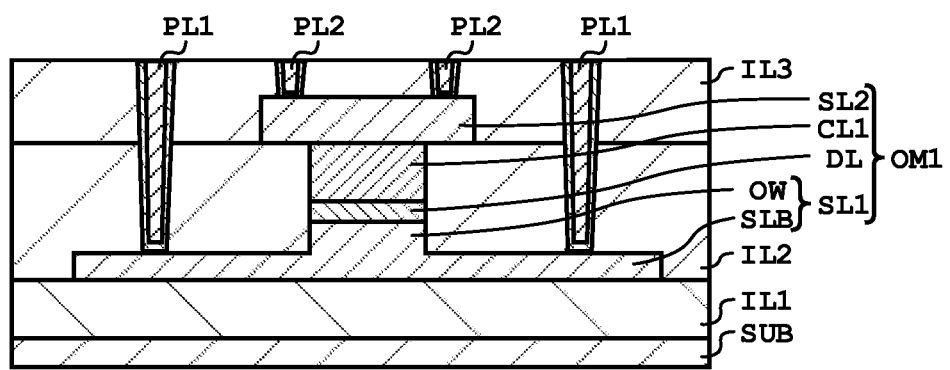
FIG. 11 is a cross-sectional view showing an exemplary step included in the method of manufacturing the semiconductor device according to the first embodiment.

Next, as shown in FIG. 11, the first plug PL1 and the second plug PL2 are formed. Specifically, the first plug PL1 can be formed by forming a through hole that penetrates the second insulating layer IL2 and the third insulating layer IL3 and reaches the slab portion SLB, and then forming a conductive film so as to bury the through hole. The second plug PL2 can be formed by forming a through hole that penetrates the third insulating layer IL3 and reaches the second semiconductor layer SL2, and then forming a conductive film so as to bury the through hole. The first plug PL1 and the second plug PL2 may be formed at the same time in a common process. The method of forming the first plug PL1 and the second plug PL2 is not particularly limited, and may be appropriately selected from known methods.

Finally, a plurality of singulated semiconductor devices SD1 are obtained by dicing the semiconductor wafer SW.

By the above manufacturing method, the semiconductor device SD1 according to the first embodiment can be manufactured. The method of manufacturing the semiconductor device SD1 according to the first embodiment may further include other steps as required. Examples of other steps include, for example, forming a wiring, arranging a laser diode as the light source, forming a grating coupler, forming a spot size converter, and forming a optical receiver. The other steps may be suitably adopted from the formation methods known in the silicon photonics art.

(Roles of the Conductive Layer CL1)

Here, roles of the conductive layer CL1 in the method of manufacturing the semiconductor device SD1 according to the first embodiment will be described. As described above, in the comparative semiconductor device 1 including the optical waveguide OW, the dielectric layer DL, and the polycrystalline semiconductor layer, the polycrystalline semiconductor layer also functions as a part of the optical waveguide. Also, a mode of light may not be adequately maintained if the height of the optical waveguide is too high. Therefore, a thickness of the semiconductor layer is limited to a predetermined thickness from the viewpoint of maintaining the mode of light traveling inside the optical waveguide OW. However, when the thickness of the semiconductor layer is insufficient, the total thickness of the optical waveguide OW, the dielectric layer DL, and the polycrystalline semiconductor layer becomes insufficient, and it becomes difficult to polish the second insulating layer IL2 so that an upper surface of the polycrystalline semiconductor layer is properly exposed in step of polishing the second insulating layer IL2.

On the other hand, in the semiconductor device SD1 according to the first embodiment, the conductive layer CL1 functions as a cladding layer. Therefore, there is no need to adjust the conductive layer CL1 in view of the mode of light traveling inside the optical waveguide OW. Therefore, in the step of polishing the second insulating layer IL2, the total thickness of the optical waveguide OW, the dielectric layer DL, and the conductive layer CL1 can be sufficiently increased, and the second insulating layer IL2 can be properly polished. As a result, the semiconductor device SD1 can be easily formed in method of manufacturing the semiconductor device SD1 according to the first embodiment.

Effect

The semiconductor device SD1 according to the first embodiment includes the optical modulator OM1 in which the optical waveguide OW, the dielectric layer DL, and the conductive layer CL1 are formed in this order. The refractive index of the material of the conductive layer CL1 is smaller than the refractive index of the material of the optical waveguide OW. Therefore, as compared with a semiconductor device including a semiconductor layer made of a material having a refractive index equivalent to a refractive index of the optical waveguide OW (hereinafter, also referred to as "comparative semiconductor device 2") instead of the conductive layer CL1, light traveling inside the optical waveguide OW is more effectively confined inside the optical waveguide OW. This makes it difficult for the light seeping out of the optical waveguide OW to reach the second semiconductor layer SL2 and the second plug PL2, which cause light scattering. From this viewpoint, first embodiment can reduce optical loss of light traveling inside the optical waveguide OW.

Strictly speaking, the light travels through the inside of the optical waveguide while seeping into the inside of the conductive layer CL1. In first embodiment, the conductive layer CL1 is made of a material having a high transmittance for light that has seeped above the optical waveguide OW.

For this reason, it is possible to reduce optical loss of light traveling inside the optical waveguide OW, as compared with a semiconductor device including a semiconducting layer made of polycrystalline silicon instead of the conductive layer CL1.

Second Embodiment

In an optical modulator OM2 according to a second embodiment, a conductive layer CL2 is directly electrically connected with a second plug PL2. An optoelectronic hybrid device LE2 and a semiconductor device SD2 according to the second embodiment differ from the optoelectronic hybrid device LE1 and the semiconductor device SD1 according to the first embodiment only in shape of the conductive layer CL2. Therefore, the same elements as those of the semiconductor device SD1 according to the first embodiment are denoted by the same reference numerals, and descriptions thereof are omitted.

Figure 12:
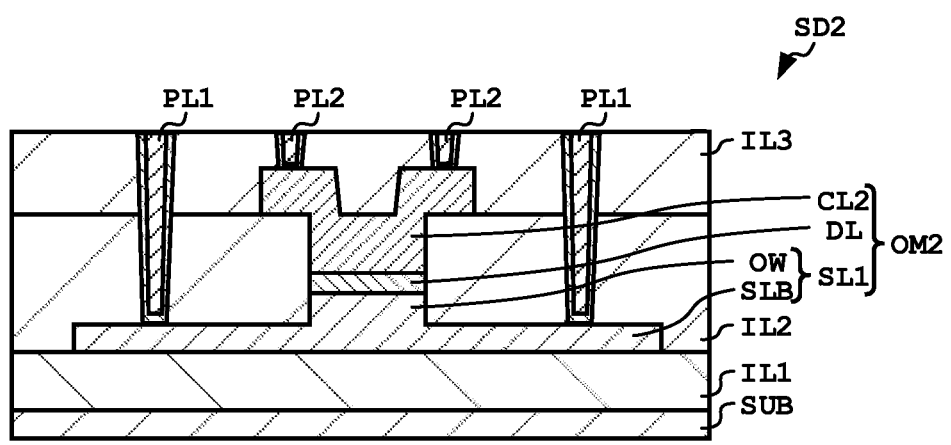
FIG. 12 is a cross-sectional view of a main portion of a semiconductor device according to a second embodiment.

FIG. 1 is a block diagram showing an exemplary circuit configuration of an optoelectronic hybrid device LE2 according to a second embodiment. FIG. 12 is a cross-sectional view of a main portion of a semiconductor device SD2. In other words, FIG. 12 is a cross-sectional view at a cross-section perpendicular to the extending direction of the optical waveguide OW and passing through the optical modulator OM2 of the semiconductor device SD2.

As shown in FIG. 12, the semiconductor device SD2 includes the substrate SUB, the first insulating layer IL1, the optical modulator OM2, the second insulating layer IL2, the third insulating layer IL3, the first plug PL1, and the second plug PL2. The optical modulator OM2 includes the first semiconductor layer SL1 including the optical waveguide OW and the slab portion SLB, the dielectric layer DL, and the conductive layer CL2.

The conductive layer CL2 is formed on the dielectric layer DL. The conductive layers CL2 constitute an electrode in the optical modulator OM2. The conductive layer CL2 is a transparent electrode in the optical modulator OM2. As a result, it is possible to suppress the light seeping out of the optical waveguide OW from being scattered by the conductive layer CL2. The conductive layer CL2 includes a first portion formed on the dielectric layer DL and a second portion formed on second insulating layer IL2. The second plug PL2 is formed such that the second plug PL2 reaches the second portion. As a result, the second plug PL2 can be formed at a position different from the optical waveguide OW in plan view. As described above, it is possible to suppress an increase in contact leakage and a loss of light seeping out of the optical waveguide OW caused by plasmon resonance. Examples of materials of the conductive layer CL2 are the same as those of the conductive layer CL1 according to the first embodiment.

(Method of Manufacturing Semiconductor Device)

Next, an exemplary method of manufacturing the semiconductor device SD2 according to the second embodiment will be described. FIGS. 13 to 20 are cross-sectional views showing exemplary steps included in the method of manufacturing the semiconductor device SD2.

The method of manufacturing the semiconductor device SD2 according to the second embodiment includes (1) providing the semiconductor wafer SW, (2) forming the dielectric layer DL, (3) forming a sacrificial layer SFL, (4) forming the optical waveguide OW, (5) forming the second insulating layer IL2, (6) polishing the second insulating layer IL2, (7) removing the sacrificial layer SFL, (8) forming the conductive layer CL2, (9) forming the third insulating layer IL3, and (10) forming the first plug PL1 and the second plug PL2.

(1) Providing the Semiconductor Wafer SW

In the same manner as in method of manufacturing the semiconductor device SD1 according to the first embodiment, the semiconductor wafer SW is provided as shown in FIG. 3.

(2) Forming the Dielectric Layer DL

The dielectric layer DL is formed on the semiconducting layer SL in the same manner as in method of manufacturing the semiconductor device SD1 according to the first embodiment, as shown in FIG. 4.

(3) Forming the Sacrificial Layer SFL

Figure 13:
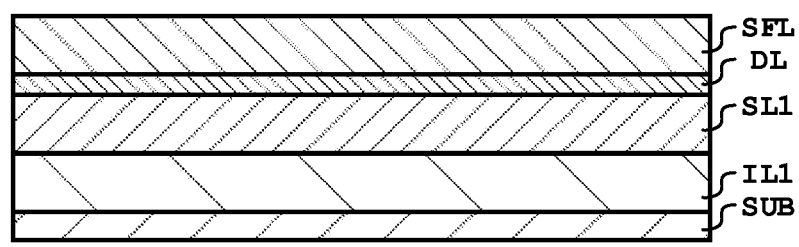
FIG. 13 is a cross-sectional view showing an exemplary step included in a method of manufacturing the semiconductor device according to the second embodiment.

Next, as shown in FIG. 13, the sacrifice layer SFL is formed on the dielectric layer DL. A thickness of the sacrificial layer SFL corresponds to the thickness of the desired conductive layer CL2. The thickness of the sacrifice layer SFL is, for example, 200 nm or more and 400 nm or less. A material of the sacrificial layer SFL is, for example, polycrystalline silicon. The sacrifice layer SFL is formed by, for example, CVD method.

(4) Forming the Optical Waveguide OW

Figure 14:
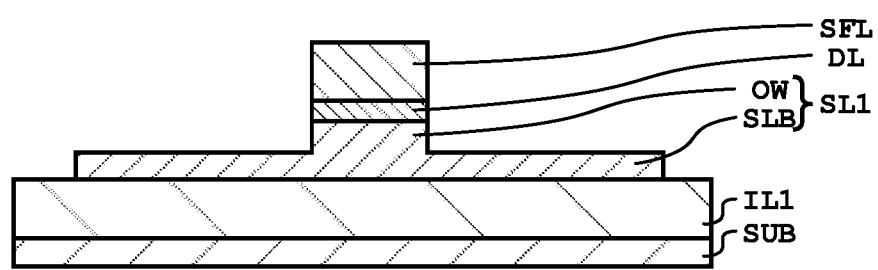
FIG. 14 is a cross-sectional view showing an exemplary step included in the method of manufacturing the semiconductor device according to the second embodiment.

Next, as shown in FIG. 14, the sacrificial layer SFL, the dielectric layer DL, and the conductive layer CL1 are patterned to form the optical waveguides OW and the slab portion SLB composed of a portion of the semiconductor layer SL (the remainder of the semiconductor layer SL). More specifically, the sacrifice layer SFL and the dielectric layer DL are removed in a region other than the region where the optical waveguide OW is formed, and patterning is performed so that a part of the semiconductor layer SL remains in the thickness direction of the semiconductor layer SL. In addition, of the semiconductor layer SL, portions of the semiconductor layer SL other than the portions that become the optical waveguides OW and the slab portion SLB are also patterned into desired patten. The patterning of the semiconductor layer SL can be performed by photolithography and etching techniques.

Impurities may be implanted into the slab portion SLB by photolithography and ion implantation method. As a result, an impurity concentration of the slab portion SLB is greater than an impurity concentration of the optical waveguide OW.

(5) Forming the Second Insulating Layer IL2

Figure 15:
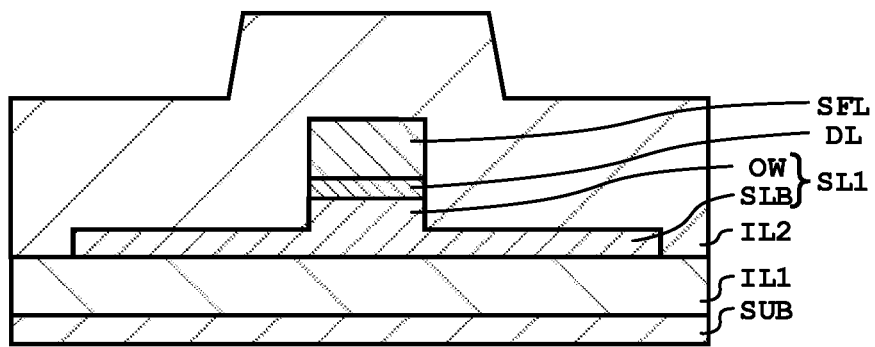
FIG. 15 is a cross-sectional view showing an exemplary step included in the method of manufacturing the semiconductor device according to the second embodiment.

Next, as shown in FIG. 15, the second insulating layer IL2 is formed on the first insulating layer IL1 so as to cover the optical waveguide OW, the slab portion SLB, the dielectric layer DL, and the sacrificial layer SFL. The second insulating layer IL2 is formed in the same manner as in method of manufacturing the semiconductor device SD1 according to the first embodiment.

(6) Polishing the Second Insulating Layer IL2

Figure 16:
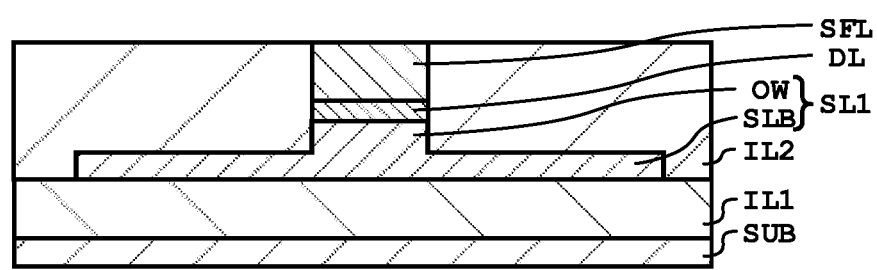
FIG. 16 is a cross-sectional view showing an exemplary step included in the method of manufacturing the semiconductor device according to the second embodiment.

Next, as shown in FIG. 16, an upper surface of the second insulating layer IL2 is polished so that the sacrificial layer SFL is exposed from the second insulating layer IL2. As a result, an upper surface of the second insulating layer IL2 and an upper surface of the sacrificial layer SFL are located in the same plane. The polishing of the second insulating layer IL2 is performed in the same manner as in method of manufacturing the semiconductor device SD1 according to the first embodiment.

(7) Removing the Sacrificial Layer SFL

Figure 17:
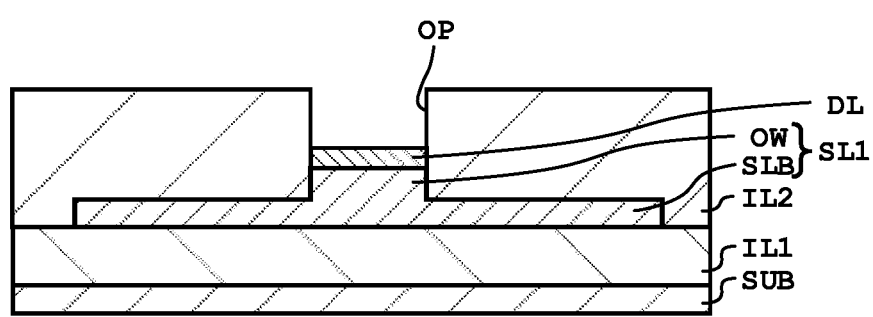
FIG. 17 is a cross-sectional view showing an exemplary step included in the method of manufacturing the semiconductor device according to the second embodiment.

Next, as shown in FIG. 17, the sacrificial layer SFL is removed to form an opening OP in second insulating layer IL2. The sacrifice layer SFL is removed by, for example, a selective dry etching method.

(8) Forming the Conductive Layer CL2

Figure 18:
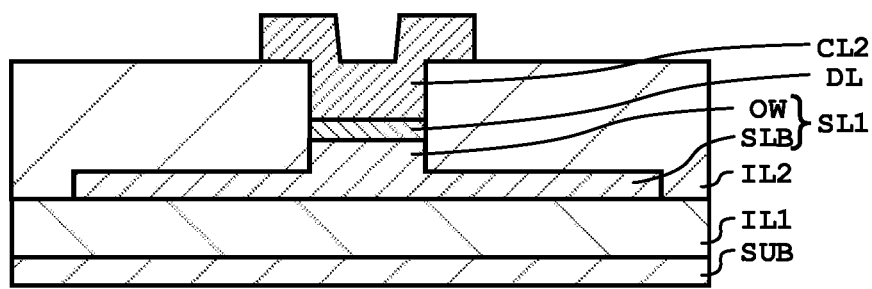
FIG. 18 is a cross-sectional view showing an exemplary step included in the method of manufacturing the semiconductor device according to the second embodiment.

Next, as shown in FIG. 18, the conductive layer CL2 is formed so as to bury the opening OP. For example, a material of the conductive layer CL2 can be formed by spattering method in the opening OP and on the second insulating layer IL2 to form a conductive film, then the conductive layer SL2 is formed by patterning the conductive film into the desired configuration through photolithography and etching techniques. Thus, the sacrificial layer SFL and the conductive layer CL2 can be replaced. As described above, the optical modulator OM2 including the first semiconductor layer SL1 including the optical waveguide OW and the slab portion SLB, the dielectric layer DL, and the conductive layer CL2 is formed.

(9) Forming the Third Insulating Layer IL3

Figure 19:
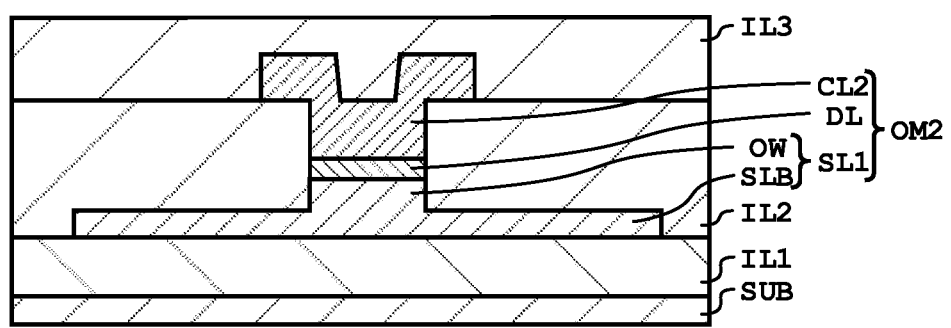
FIG. 19 is a cross-sectional view showing an exemplary step included in the method of manufacturing the semiconductor device according to the second embodiment.

Next, as shown in FIG. 19, the third insulating layer IL3 is formed on the second insulating layer IL2 so as to cover the conductive layer CL2. The second insulating layer IL2 is formed in the same manner as in method of manufacturing the semiconductor device SD1 according to the first embodiment.

(10) Forming the First Plug PL1 and the Second Plug PL2

Figure 20:
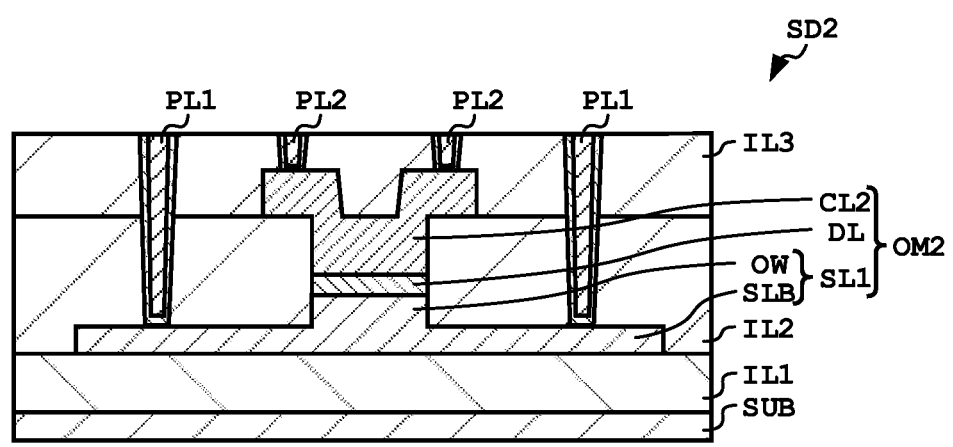
FIG. 20 is a cross-sectional view showing an exemplary step included in the method of manufacturing the semiconductor device according to the second embodiment.

Next, as shown in FIG. 20, the first plug PL1 and the second plug PL2 are formed. Specifically, the first plug PL1 can be formed by forming a through hole that penetrates the second insulating layer IL2 and the third insulating layer IL3 and reaches the slab portion SLB, and then forming a conductive film so as to bury the through hole. In addition, the second plug PL2 can be formed by forming a through hole that penetrates the third insulating layer IL3 and reaches the conductive layer CL2, and then forming a conductive film so as to bury the through hole. The first plug PL1 and the second plug PL2 may be formed at the same time in a common process. The method of forming the first plug PL1 and the second plug PL2 is not particularly limited, and may be appropriately selected from known methods.

Finally, a plurality of singulated semiconductor devices SD2 are obtained by dicing the semiconductor wafer SW.

By the above manufacturing method, the semiconductor device SD2 according to the second embodiment can be manufactured.

Effect

The semiconductor device SD2 according to the second embodiment has similar effects as the semiconductor device SD1 according to the first embodiment. In the semiconductor device SD2 according to the second embodiment, the conductive layer CL2 is directly electrically connected with the second plug PL2. As a result, it is possible to reduce variations in characteristics such as resistivity and parasitic capacitances at the interface between the conductive layer CL2 and the second plug PL2 due to the difference between the material of the conductive layer CL2 and the material of second plug PL2. As a result, variations in the characteristic of optical modulator in the high-frequency modulation can be reduced. As a result, the characteristic of the semiconductor device SD2 can be further enhanced.

It should be noted that the present invention is not limited to the above-mentioned embodiments, and various modifications can be made without departing from the gist thereof. For example, although according to the semiconductor device SD1 and SD2 of the above embodiments have been described as having the optical modulator OM1 and OM2 as optical elements, they may have other optical elements such as a grating coupler, a spot size converter, and an optical receiver as required.

In addition, even when a specific numerical value example is described, it may be a numerical value exceeding the specific numerical value, or may be a numerical value less than the specific numerical value, except when it is theoretically obviously limited to the numerical value. In addition, the component means "B containing A as a main component" or the like, and the mode containing other components is not excluded.

What is claimed is:

1. A semiconductor device comprising:
    a substrate;
    a first insulating layer formed on the substrate;
    a first semiconductor layer formed on the first insulating layer, wherein the first semiconductor layer includes i) an optical waveguide and ii) a slab portion such that the optical waveguide and the slab portion are formed contiguously without an interface therebetween;
    a dielectric layer made of silicon oxide and formed on the optical waveguide;
    a conductive layer formed on the dielectric layer;
    a second semiconductor layer formed on the conductive layer, wherein the second semiconductor layer includes i) a first portion and ii) a second portion integrally formed with the first portion, wherein the first portion overlaps i) the conductive layer, ii) the dielectric layer, and iii) the optical waveguide of the first semiconductor layer in a top-down view, and wherein the second portion does not overlap i) the conductive layer, ii) the dielectric layer, and iii) the optical waveguide of the first semiconductor layer in the top-down view;
    a first plug connected to the slab portion of the first semiconductor layer such that the first plug is electrically connected with the first semiconductor layer;
    a second plug connected to the second portion of the second semiconductor layer such that the second plug is electrically connected with the second semiconductor layer; and
    a second insulating layer formed on the first insulating layer so that the second insulating layer contacts i) the first semiconductor layer, ii) the dielectric layer, and iii) the conductive layer,
    wherein a refractive index of a material of the conductive layer is smaller than a refractive index of a material of the first semiconductor layer.

2. The semiconductor device according to claim 1, wherein the refractive index of the material of the conductive layer is 1.5 or more and 2.0 or less.

3. The semiconductor device according to claim 1, wherein the conductive layer has a transmittance of 60% or more with respect to light having a wavelength of 1.1 μm or more and 1.6 μm or less.

4. The semiconductor device according to claim 1, wherein the material of the conductive layer is selected from the group consisting of indium tin oxide, titanium oxide, gallium-doped zinc oxide, and indium-gallium-doped zinc oxide.

5. The semiconductor device according to claim 1, wherein the second semiconductor layer is made of polycrystalline silicon.

6. The semiconductor device according to claim 1, wherein a conductivity type of the first semiconductor layer and a conductivity type of the second semiconductor layer are n-type.

7. The semiconductor device according to claim 1, wherein a thickness of the conductive layer is 350 nm or more and 400 nm or less.

8. The semiconductor device according to claim 1, further comprising a third insulating layer formed on the second insulating layer so that the third insulating layer contacts the second semiconductor layer.

9. The semiconductor device according to claim 8, wherein a refractive index of a material of each of the first insulating layer, the second insulating layer, and the third insulating layer is smaller than the refractive index of the material of the conductive layer.

10. The semiconductor device according to claim 1, wherein a refractive index of a material of each of the first insulating layer and the second insulating layer is smaller than the refractive index of the material of the conductive layer.

* * * * *